No. 772,154. PATENTED OCT. 11, 1904.
C. A. JUENGST.
COLD METAL SAW BLADE.
APPLICATION FILED MAR. 27, 1903.
NO MODEL.
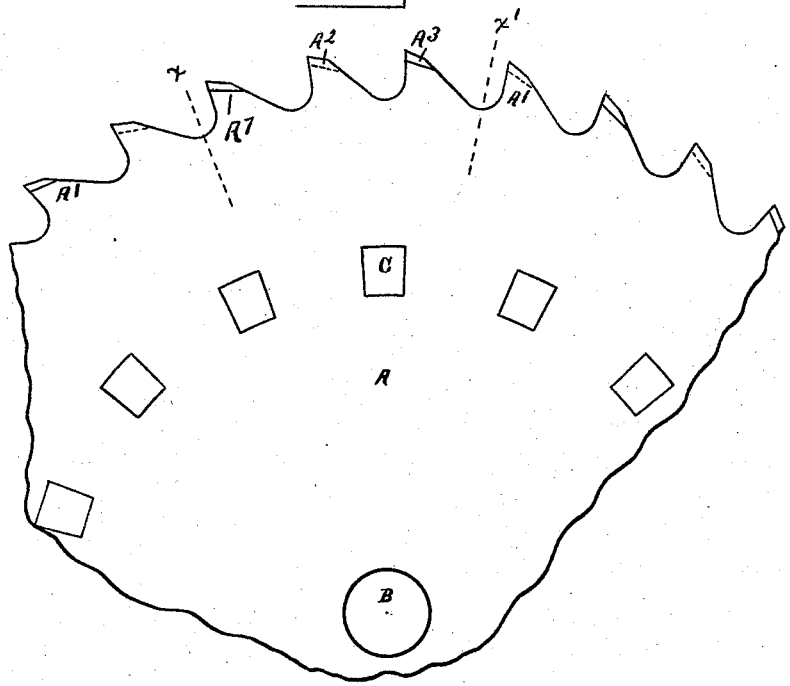
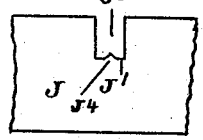
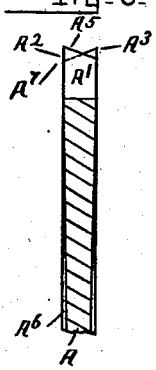
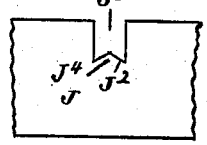
Witnesses
L. Hensel
A. Hensel
Inventor
Charles A. Juengst.
By E. T. Thomas.
Atty.

No. 772,154. Patented October 11, 1904.

UNITED STATES PATENT OFFICE.

CHARLES A. JUENGST, OF CROTON FALLS, NEW YORK, ASSIGNOR TO HIGLEY MACHINE COMPANY, OF NEW YORK, N. Y., A CORPORATION OF NEW YORK.

COLD-METAL SAW-BLADE.

SPECIFICATION forming part of Letters Patent No. 772,154, dated October 11, 1904.

Application filed March 27, 1903. Serial No. 149,869. (No model.)

*To all whom it may concern:*

Be it known that I, CHARLES A. JUENGST, a citizen of the United States, residing at Croton Falls, in the county of Westchester and State of New York, have invented an Improvement in Metal Saw-Blades, of which the following is a specification.

This invention relates to that class of circular saws in which the teeth are so ground as to form edges that will cut without clogging.

It consists in providing a portion of the teeth of the saw alternately with a periphery for an appreciable distance at right angles to the straight side of the blade and from the inner end of this cutting-surface inclining the cutting edge to the other side of the blade, forming an obtuse angle, the remainder of the teeth having their cutting-surfaces alternately inclined right and left the full width of the saw-blade. The teeth are preferably arranged in two alternating series, two teeth in each series.

In the drawings, Figure 1 represents a section of a metal saw-blade. Fig. 2 is a cross-section on line $x$ of Fig. 1. Fig. 3 is a cross-section on line $x'$ of Fig. 1. Fig. 4 shows the base of the cut made by teeth, as shown in Fig. 2; and Fig. 5 shows the base of the cut made by teeth, as shown in Fig. 3.

A, Fig. 1, represents a circular-saw blade. It is provided with an aperture B to receive the arbor upon which it is mounted. There are also recesses C for sprocket-teeth, by which the saw is driven. The sides of the saw-blade may be concave, as shown at $A^6$, Figs. 2 and 3.

The teeth in the one series $A^2 A^3$, Fig. 2, have a periphery $A^4$ an appreciable distance at right angles to the straight side $A^7$, and the surface is then inclined at an obtuse angle, as shown in said Fig. 2. This series of teeth form a right-angle cut, as shown at $J'$ in the slot $J^3$ of the block J in Fig. 4.

The teeth in the second series $A^2 A^3$, Fig. 3, have their entire cutting-faces alternately inclined right and left from a straight side $A^7$. This series of teeth forms an angle cut, as shown at $J^4$, in the slot $J^3$ of the block J, Fig. 5.

All the teeth in the saw are of the same radius.

It will be seen that by this construction the cut made by the teeth in one series will be cleared by the teeth in the other series, and the saw can be worked rapidly without clogging.

I claim as my invention—

1. A circular saw having a portion of its teeth with their cutting-surfaces alternately inclined right and left the full width of the saw-blade, and the remainder of the teeth each having a periphery for an appreciable distance at right angles to the straight side of the saw-blade and then inclined to the other side of the blade.

2. A circular-saw blade having two alternating series of teeth in pairs, the one series of teeth having their entire cutting-faces inclined right and left the full width of the blade, and the other series of teeth having their peripheries from opposite sides of the blade for an appreciable distance at right angles to the sides of the saw-blade and surfaces inclined right and left at an obtuse angle thereto.

Signed at Croton Falls, in the county of Westchester and State of New York, this 24th day of March, A. D. 1903.

CHARLES A. JUENGST.

Witnesses:
E. T. THOMAS,
E. LUFF.